Patented May 15, 1951

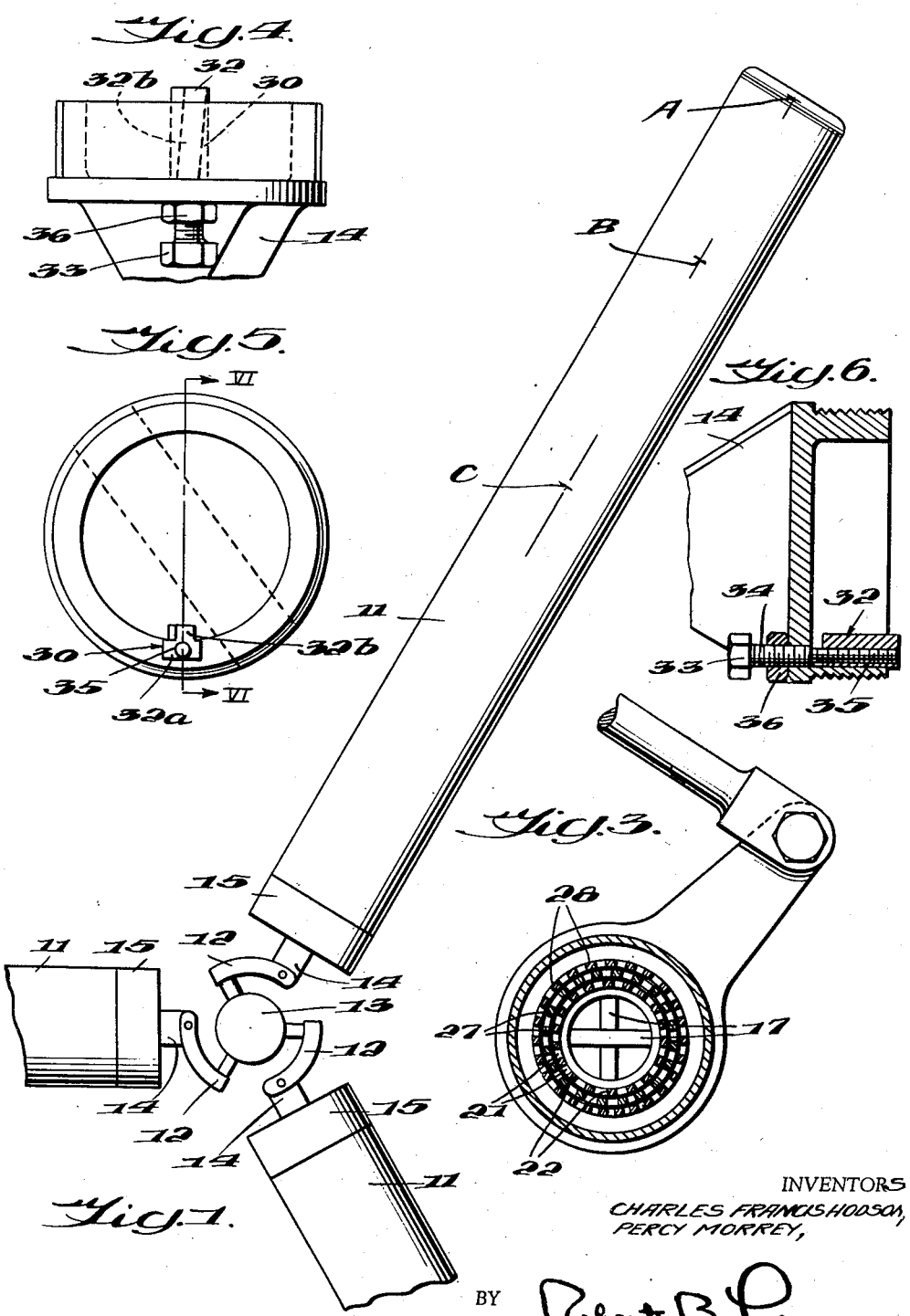

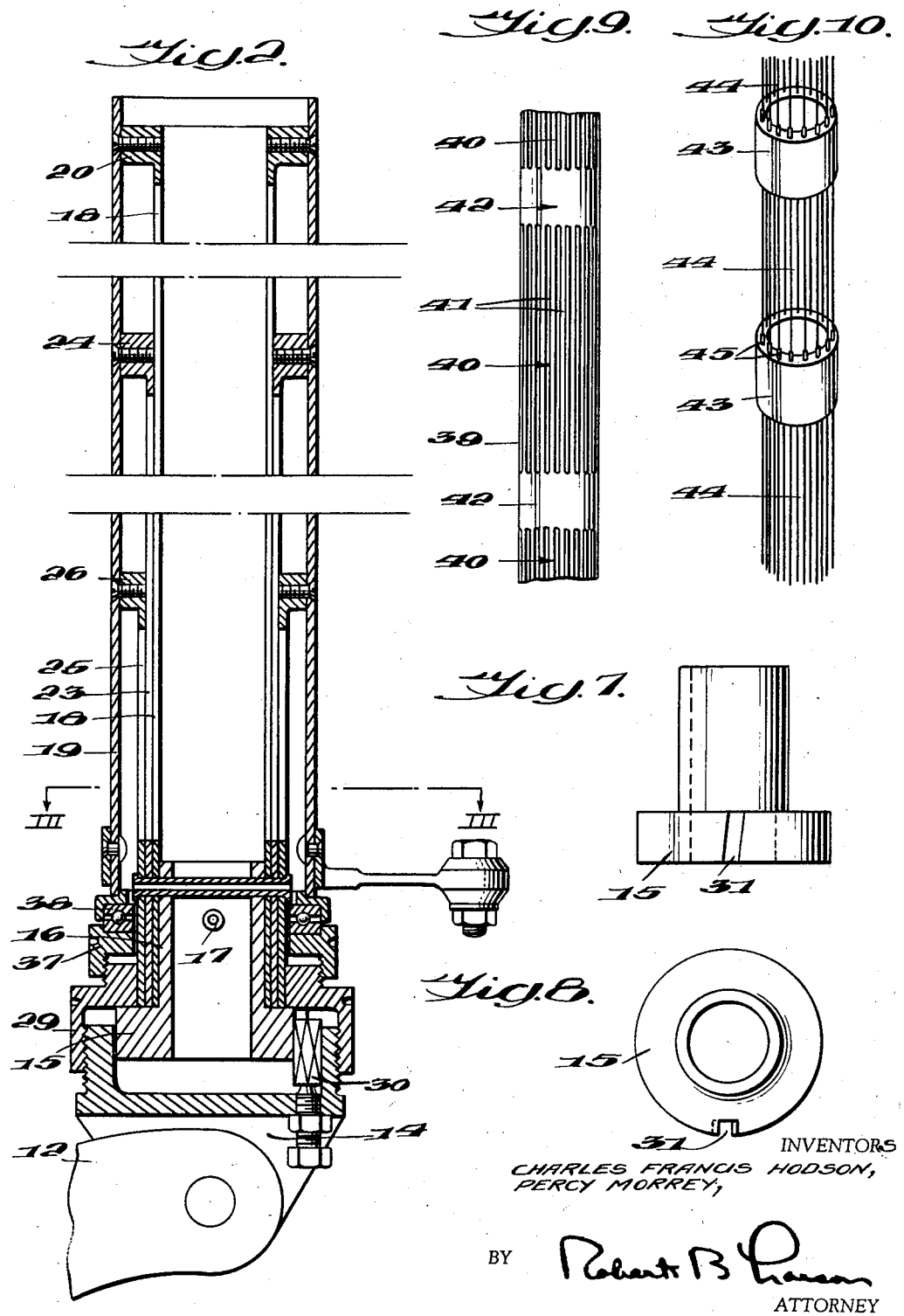

2,553,193

UNITED STATES PATENT OFFICE 2,553,193

ROTOR BLADE FOR ROTARY WING AIRCRAFT

Charles Francis Hodson, North Acton, and Percy Morrey, Osterley Park, England, assignors to The Fairey Aviation Company Limited, Hayes, England Application July 29, 1947, Serial No. 764,504
In Great Britain August 12, 1946

9 Claims. (Cl. 170—160.53)

This invention relates to rotor blades for rotary wing aircraft, and especially, though not exclusively, to large diameter rotor blades, which are required to resist large centrifugal forces. Hitherto difficulty has been experienced in providing, at the roots of such blades, suitable thrust races which will not only stand up to the centrifugal loading but will also permit the pitch of the blades to be varied readily as required. It is an object of the invention to provide a blade which, while easily adjustable for pitch either cyclically or collectively without the generation of excessive couples or high torsional stresses, is torsionally sufficiently rigid to retain a selected pitch angle throughout its length, and which will transmit the centrifugal forces generated without recourse to the use of heavy thrust races.

According to the present invention a rotor blade for a rotary wing aircraft has at least one tension link within a spar or other supporting structure to support the blade, said link comprising a series of rods arranged in annular spaced relation and secured at their inner ends to a root member for the blade and at their outer ends to the spar.

Two or more links may be arranged one within another, the inner link extending the full length of the spar, and the outer link or links being successively shorter.

Each link may consist of a tube slotted longitudinally to form the series of rods, and the ends of said tube, beyond the slots, may serve to unite said rods and maintain them in spaced relation.

The slots in at least one link may be interrupted so as to present two or more series of co-extensive and co-terminous slots.

The rotor blade may have a blade mounting member arranged to be angularly adjustable relatively to the root member to enable the link or links to be pre-set so as to exert zero torque at any desired pitch setting of the blade, and the root member may be arranged to be adjustable axially relatively to the blade mounting member, so as to enable the link or links to be pre-set at any desired tension.

Several forms of the invention will be described with reference to the accompanying drawings, in which:

Figure 1 is a diagrammatic plan of a rotor;
Figure 2 is a sectional plan of one of the rotor blades, on a larger scale;
Figure 3 is a cross-section of the blade on the line III—III, Figure 2;
Figure 4 is a fragmentary elevation of one of the components of the blade mounting assembly;
Figure 5 is a plan of the component;
Figure 6 is a fragmentary sectional view of the component on the line VI—VI, Figure 5, showing also an adjusting assembly;
Figures 7 and 8 are an elevation and a plan, respectively, of another component;
Figure 9 is a diagrammatic fragmentary elevation of another form of tension link, and
Figure 10 is a diagrammatic fragmentary perspective view of a further form of tension link.

Referring to Figures 1 and 2, rotor blades 11 are pivotally mounted on drag links 12 around a rotor head 13, each blade having a tubular central spar around which the outer skin of the blade is secured by ribs or the like in any desired manner. The inner end of the spar abuts against an antifriction thrust bearing carried by a member 14 in the blade mounting assembly, which will be described in detail with reference to Figure 2. A root member 15 in the blade mounting assembly has an outwardly directed tubular spigot 16, around and secured to which by pins 17 is one end of a tube 18 which extends coaxially with and within the spar 19, but is of considerably less diameter than the spar. At its outer end the tube 18 is secured, through an annular distance piece 20, to the outer end of the spar, at a position indicated at A, Figure 1. The tube 18 is formed with a series of about twenty parallel longitudinal slots 21 (see Figure 3) equally spaced around its periphery and extending over its whole length, with the exception of the portions at its ends where it is secured to the root member 15 and to the spar 19 by the annular member 20 respectively, and the portions of the wall of the tube 18 between the slots 21 constitute a series of parallel rods 22 disposed in annular spaced relation around the interior of the spar 19, while the tube 18 as a whole constitutes a tension link.

A second tension link consisting of a tube 23 similar to the tube 18 is arranged between the first tension link and the spar 19, and is similarly secured at its inner end to the tubular spigot 16 of the root member 15 and at its outer end, through an annular distance piece 24 to the spar 19 at a point about three-quarters of the way along the length of the spar from the root, at the position indicated at B, Figure 1. A third tension link consisting of a tube 25 similar to the second is arranged between the second tube 23 and the spar 19 and is similarly secured at its inner end, its outer end extending about halfway along the length of the spar 19 from the root and being secured to the spar through an annular distance piece 26 at the position indicated at C, Figure 1.

It is desirable that the torsional stresses in all the links should be of the same order and degree, and as the rate of twist per unit length of any link is inversely proportional to the length of that link (since the angle through which the blade 11 is moved for any given pitch setting may be considered as constant for all points along its length), the cross-sectional dimensions of the rods 27 and 28 forming the second and third links respectively may be reduced, and the number of rods correspondingly increased, so that the strength of the links to resist tension remains the same.

The root member 15 is mounted so as to be slidable axially in the blade mounting member 14 pivotally secured to the drag link 12, and is retained therein by a retaining ring 29 threaded on to the outside of the blade mounting member 14. The inner periphery of the blade mounting member 14 is formed with a key-way 30 cut parallel with the axis of the blade, and the outer periphery of the root member 15 is formed with a key-way 31 cut on a helix (see Figures 4 to 8). A key 32 (see Figures 4 and 5) having portions 32a, 32b to fit the key-ways 30, 31 respectively is movable axially by an adjusting screw 33 disposed parallel with the blade axis and received in a threaded aperture in the blade mounting member 14, and the aperture and the co-acting part 34 of the adjusting screw 33 are coarsely threaded. A further part 35 of the adjusting screw 33 is more finely threaded, and is received in a corresponding threaded aperture formed axially in the key 32. By these means the key 32 may be moved axially in the key-ways 30 and 31 and set within fine limits, and by its axial movement imparts an angular adjustment to the root member 15 relatively to the blade mounting member 14, thus giving a torsional setting to the tension links. The links may thus be pre-set to exert zero torque at any desired pitch setting of the blade. After such pre-setting the adjusting screw may be locked by a lock-nut 36.

An adjusting ring 37, threaded so as to be movable axially, is disposed between the retaining ring 29 which is correspondingly threaded, and the thrust bearing 38 for the spar 19. Consequently by rotation of the adjusting ring 37 the spar 19 may be moved axially to vary the initial tension in the tension links as desired.

Referring now to Figure 9, in an alternative form of the invention the slotted tube 39 constituting a tension link and corresponding with the tube 18 shown in Figure 2 is formed with two or more series 40 of co-extensive slots 41 of similar length. At intervals along its length of about 20 to 30 inches annular zones 42 of its wall are left unslotted, thus serving to maintain the tube 39 in cylindrical shape by resisting forces tending to deform it. Such an alternative construction is especially applicable to the longest link (the tube 18, Figure 2) extending the whole length of the spar, and rotary wings according to the invention may be provided with one link of the alternative construction and others of the first-mentioned or other constructions.

In yet a further form of the invention shown in Figure 10 the link may be made up of two or more rings 43 having an annular series of separate rods 44 arranged between each pair of adjacent rings, and the rods may be secured, e. g. by locking in sockets in the rings so as to resist torsion, by threading or welding or in ferrules 45 as in the manner of the spokes of a cycle wheel.

We claim:

1. A rotor blade for a rotary wing aircraft, having a root member, a spar extending substantially the entire length of said blade, said spar being angularly movable relatively to the root member, mounting means for said root member, a thrust bearing positioned between the inner end of the spar and said mounting means, a tension link comprising a series of rods arranged in annular spaced relation, the rods being secured at their inner ends to the root member and at their outer ends to the spar intermediate the ends of the spar, and serving to retain the spar against outward displacement, the intermediate spacing providing a distribution of compression and tension stresses between said link and said spar thereby reducing the stress on the spar and means threaded on said mounting member abutting said thrust bearing for providing relative axial movement between said spar and said root member to adjust the initial tension on said tension link.

2. A rotor blade for a rotary wing aircraft, having a root member, a spar extending substantially the entire length of said blade, said spar being angularly movable relatively to the root member, supporting means for said root member, a thrust bearing positioned between the inner end of the spar and said supporting means, and at least two tension links secured at their inner ends to the root member and at their outer ends to the spar, the links being located one within another, the inner link extending substantially the full length of the spar and being attached to the outer end portion of the spar, and each outer link being successively shorter and attached, respectively, to widely spaced localities along the spar, the arrangement of links thereby reducing the stress on the spar and distributing among the links the stresses resulting from centrifugal force which ordinarily would be sustained by the blade or blade supporting structure.

3. A rotor blade for a rotary wing aircraft, having a root member, a spar extending substantially over the entire length of said blade, said spar being angularly movable relatively to said root member, supporting means for said root member, a thrust bearing interposed between the inner end of the spar and said supporting means, at least two tension links, said links being located one within the other, the inner link extending substantially the full length of the spar and being attached to the outer end portion of the spar, and each outer link being successively shorter and attached respectively to widely spaced localities along the spar to reduce stresses in said spar, a blade mounting member angularly adjustable relatively to the root member and in telescoping relation with said root member, cooperating axial and helical keyways in the telescoping portion of said blade mounting member and said root member, and a key adjustably positioned in said keyways providing said angular adjustment and enabling the tension links to be pre-set to exert zero torque at any desired pitch setting of the blade.

4. A blade according to claim 2, a blade mounting member, and means mounted on said blade mounting member for providing axial adjusting movement between said root member and said spar, thereby enabling the tension link to be preset at any desired tension.

5. A blade as set forth in claim 2, a blade mounting member, said supporting means for said root means comprising a first threaded collar mounted on said blade mounting member and holding said root member against radial movement under the action of centrifugal force, and a second threaded collar mounted on said first collar and adjustable in an axial direction relative to the root member, said second collar being in contact with said thrust bearing, whereby said pre-setting of the tension of said tension link is accomplished by rotation of the second collar and the resulting relative axial movement between said second collar and said root member.

6. A blade as set forth in claim 2, a blade mounting member angularly adjustable relative to said root member and in telescoping relation with said root member, keyways inclined to each other in the telescoping portions of said blade mounting member and said root member, a key adjustable along said keyways to provide angular adjustment of the blade mounting member and root member to provide for pre-setting of said tension links to zero torque at any desired pitch setting of the blade, said supporting means for the root member including a first threaded collar mounted on said blade mounting member to hold said root member in telescoping relation therewith, and a second collar member threaded on said first collar member and movable into contact with said thrust bearing to enable pre-setting of the tension on said tension link.

7. A rotor blade for a rotary wing aircraft, having a root member, a spar extending substantially the full length of the blade and being angularly movable relatively to the root member, an anti-friction abutment interposed between the root member and said spar, and arranged to resist inward thrust of the blade on said root member in the direction of the axis of the blade, and three concentric tension links each comprising a series of rods arranged in annular spaced relation, the rods being secured at their inner ends to the root member and at their outer ends to the spar, the innermost link extending substantially the full length of the spar from the root member to the neighborhood of the tip of the rotor blade, the middle link extending from the root member about four-fifths of the length of the spar, and the outermost link extending from the root member about one-half of the length of the spar, and said links serving to retain the spar against outward displacement and against said anti-friction abutment.

8. A rotor blade for a rotary wing aircraft comprising, in combination, a long tubular spar of substantially uniform cross-section and extending substantially the full length of the blade, a root member located at one end of said spar and a plurality of tension links, each tying said root member to one locality only on said spar, the localities of attachment to said spar being widely distributed therealong, and said spar being angularly movable with respect to said root member, the arrangement of links thereby reducing the stress on the spar and distributing among the links the stresses resulting from centrifugal force which ordinarily would be sustained by the blade or blade supporting structure.

9. A blade as claimed in claim 8, comprising further supporting means formed with a keyway, said root member being rotatably mounted in said supporting means and formed with a keyway inclined to said first mentioned keyway, a key formed with parts respectively slidable along said keyways, and means for adjusting said key along said keyways and locking said key in adjusted position.

CHARLES FRANCIS HODSON.
PERCY MORREY.

REFERENCES CITED

The following references are of record in the file of this patent:

UNITED STATES PATENTS

| Number | Name | Date |
| --- | --- | --- |
| 1,973,573 | Lougheed | Sept. 11, 1934 |
| 2,047,776 | Hafner | July 14, 1936 |
| 2,067,633 | Hafner | Jan. 12, 1937 |
| 2,121,345 | Hafner | June 21, 1938 |
| 2,215,609 | Gilbert | Sept. 24, 1940 |
| 2,365,357 | Prewitt | Dec. 19, 1944 |
| 2,430,947 | Platt | Nov. 18, 1947 |

FOREIGN PATENTS

| Number | Country | Date |
| --- | --- | --- |
| 568,951 | France | Apr. 4, 1924 |
| 591,741 | France | Apr. 16, 1925 |
| 30,244 | France | Mar. 30, 1926 |
| (Addition to No. 591,741) | | |
| 385,074 | Great Britain | Dec. 22, 1932 |
| 449,664 | Great Britain | July 1, 1936 |